US008854944B2

(12) United States Patent
Jou et al.

(10) Patent No.: US 8,854,944 B2
(45) Date of Patent: Oct. 7, 2014

(54) METHODS AND APPARATUS FOR INTERFERENCE CANCELLATION

(75) Inventors: Yu-Cheun Jou, San Diego, CA (US); Rashid A. Attar, San Diego, CA (US); Peter J. Black, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 672 days.

(21) Appl. No.: 12/614,436

(22) Filed: Nov. 8, 2009

(65) Prior Publication Data

US 2011/0085520 A1 Apr. 14, 2011

Related U.S. Application Data

(60) Provisional application No. 61/145,537, filed on Jan. 17, 2009, provisional application No. 61/250,728, filed on Oct. 12, 2009.

(51) Int. Cl.
*H04B 1/10* (2006.01)
*H04B 1/7107* (2011.01)

(52) U.S. Cl.
CPC .............. *H04B 1/7107* (2013.01); *H04B 1/10* (2013.01)
USPC .......... 370/208; 370/328; 370/479; 455/63.1; 375/346

(58) Field of Classification Search
None
See application file for complete search history.

(56) References Cited

U.S. PATENT DOCUMENTS

| 6,459,693 | B1 * | 10/2002 | Park et al. ..................... 370/342 |
| 7,200,183 | B2 * | 4/2007 | Olson et al. ................... 375/285 |
| 2003/0076872 | A1 * | 4/2003 | Jalloul et al. ................. 375/141 |
| 2007/0127558 | A1 * | 6/2007 | Banister ....................... 375/148 |

FOREIGN PATENT DOCUMENTS

WO WO03017558 A2 2/2003

OTHER PUBLICATIONS

International Search Report—PCT/US2010/021262—International Search Authority, European Patent Office, Mar. 25, 2010.
Written Opinion—PCT/US2010/021262—ISA/EPO—Mar. 25, 2010.

* cited by examiner

*Primary Examiner* — Timothy J Weidner
(74) *Attorney, Agent, or Firm* — Stanton Braden

(57) ABSTRACT

Disclosed are methods and apparatus for interference cancellation in a wireless communication system. In particular, the disclosed methods and apparatus provide for interference cancellation in a wireless device, including extending linear interference cancellation techniques, such as quasi-linear interference cancellation (QLIC), in the wireless device to a first orthogonal set, which may be a first quasi orthogonal function (QOF) set for a cdma2000 system to cancel interference from that set upon another desired QOF set. QLIC may also be extended to cancellation of signals from non-intended base stations as well. Accordingly, the present methods and apparatus afford reduced interference through QLIC by canceling signals due to either undesired QOF sets or non-intended base stations, which in turn results in an increase in forward link capacity.

28 Claims, 5 Drawing Sheets

METHODS AND APPARATUS FOR INTERFERENCE CANCELLATION

CLAIM OF PRIORITY UNDER 35 U.S.C. §119

The present Application for Patent claims priority to the following Provisional Applications:

No. 61/145,537 entitled "Methods and Apparatus for Interference Cancellation" filed Jan. 17, 2009, and assigned to the assignee hereof and hereby expressly incorporated by reference herein; and No. 61/250,728 entitled "Methods and Apparatus for Interference Cancellation" filed Oct. 12, 2009, and assigned to the assignee hereof and hereby expressly incorporated by reference herein.

BACKGROUND

1. Field

The present disclosure relates generally to interference cancellation in communication systems, and more specifically to apparatus and methods for performing interference cancellation among Quasi-orthogonal Function (QOF) sets in a wireless communication system, such as a cdma2000 system.

2. Background

A wireless multiple-access communication system can concurrently communicate with multiple wireless devices, e.g., cellular phones. Examples of such multiple-access systems include Code Division Multiple Access (CDMA) systems, Time Division Multiple Access (TDMA) systems, and Frequency Division Multiple Access (FDMA) systems.

A wireless multiple-access system typically includes many base stations that provide communication coverage for a large geographic area. Each base station may transmit data to one or more wireless devices located within its coverage area at any given moment. A given wireless device may receive a desired transmission from a serving base station as well as interfering transmissions from nearby base stations. These interfering transmissions are intended for other wireless devices located within the coverage areas of these nearby base stations but act as interference to this given wireless device. The interference hinders the wireless device's ability to demodulate the desired transmission and has a large impact on performance.

Current cdma2000 systems, in particular, are not code limited if using an IS-2000 configuration such as Radio Configuration 4 due to forward link (FL) capacity limitations. With receive diversity or capacity enhancements proposed for the new radio configuration of mobile stations (MS) in cdma2000 1x, the FL capacity can be severely code limited due to a limitation on the number of Walsh codes. It is known, however, to utilize Quasi-Orthogonal Functions (QOFs) as a way to eliminate the code limitations. QOFs consist of the multiplication of Walsh codes by a QOF mask, which is a vector of binary symbols. There are four different orthogonal QOF sets (e.g., sets 1 through 4), with each set being generated using a different QOF mask. The resulting codes are not fully orthogonal to the original Walsh codes, but the masks are configured to minimize the correlation (non-orthogonality) between the generated QOFs and the regular Walsh codes. Users in a QOF set are orthogonal, whereas different QOF sets have minimized cross-correlation.

Linear interference cancellation techniques such as Quasi-linear interference cancellation (QLIC) or Forward Linear interference cancellation (FLIC) may be also utilized to reduce interference from code channels for each sector in a sectortized cell in an active set of a mobile station (i.e., cancel signals from an interfering base station in the mobile station's active set). Examples of the application of QLIC may be found in pending U.S. patent application Ser. Nos. 11/285,510, 11/535,848, and 12/020,417 all of which are assigned to the assignee hereof, and expressly incorporated by reference herein.

Users in other orthogonal sets, which are introduced through the use of QOF (e.g., QOF set 1), are mutually orthogonal within the set, but are not orthogonal to the other orthogonal sets (e.g., QOF set 2). Accordingly, users in one orthogonal set will interfere with users in other orthogonal sets. Thus, in particular technologies, such as cdma2000 1x, there is a need to overcome code capacity limitations through QOF, while reducing or cancelling interference from code channels in a sector through QLIC without interference between users in different orthogonal sets.

SUMMARY

According to an aspect, a method for interference cancellation in a wireless device is disclosed. The method includes determining at least one cancellation signal based on one or more signals received in the wireless device. Additionally, the method includes canceling interference by at least one received interfering signal from at least one of a first quasi orthogonal function (QOF) set and at non-intended base station based on the determined at least one cancellation signal.

In another aspect, an apparatus is disclosed for interference cancellation in a wireless device. The apparatus includes at least one processor configured to determine at least one cancellation signal based on one or more signals received in the wireless device; and cancel interference by at least one received interfering signal from at least one of a first quasi orthogonal function (QOF) set and a non-intended base station based on the determined at least one cancellation signal; and a memory coupled to the at least one processor.

In still another aspect, an apparatus for interference cancellation in a wireless device is disclosed, where the apparatus includes means for determining at least one cancellation signal based on one or more signals received in the wireless device. The apparatus also includes means for canceling interference by at least one received interfering signal from at least one of a first quasi orthogonal function (QOF) set and a non-intended base station based on the determined at least one cancellation signal.

In a final aspect, a computer program product comprising a computer-readable medium is disclosed. The computer-readable medium includes code for causing a computer to determine at least one cancellation signal based on one or more signals received a wireless device. Furthermore, the computer-readable medium includes code for causing a computer to cancel interference by at least one received interfering signal from at least one of a first quasi orthogonal function (QOF) set and a non-intended base station based on the determined at least one cancellation signal.

DETAILED DESCRIPTION

In order to utilize QOF in a communication system such as cdma2000 1x, while reducing or cancelling interference from code channels in a sector through linear cancellation techniques, such as QLIC, without interference between users in different orthogonal sets, the present disclosure effects an extension of quasi-linear interference cancellation (QLIC) techniques to cancel the interference due to the other orthogonal sets introduced by QOF. This extension may be accomplished by applying QLIC to other orthogonal sets introduced via QOF. In the case of cdma2000 1x, as an example, the present disclosure effects extension of QLIC to other mobile stations assigned to orthogonal sets beyond a first orthogonal set (Orthogonal Set 1) (e.g., application of QLIC to Orthogonal sets 2 through 4). This extension affords reduction in interference due to the use of additional orthogonal sets introduced through QOF, and thus an increase in the forward link (FL) capacity as well.

The interference cancellation techniques described herein may be used for various communication systems such as CDMA, TDMA, FDMA, Orthogonal FDMA (OFDMA), and Single-Carrier FDMA (SC-FDMA) systems. A CDMA system may implement one or more CDMA Radio Access Technologies (RATs) such as cdma2000, cdma2000 1x, Wideband-CDMA (W-CDMA), and so on. cdma2000 covers IS-2000, IS-856, and IS-95 standards. A TDMA system may implement a RAT such as GSM. These various RATs and standards are known in the art. W-CDMA and GSM are described in documents from a consortium named "3rd Generation Partnership Project" (3GPP). cdma2000 is described in documents from a consortium named "3rd Generation Partnership Project 2" (3GPP2). 3GPP and 3GPP2 documents are publicly available. An OFDMA system utilizes OFDM to transmit symbols in the frequency domain on orthogonal subcarriers. An SC-FDMA system transmits symbols in the time domain on orthogonal subcarriers. For clarity, the techniques are described below for a CDMA system, which may be a cdma2000 system, a W-CDMA system, or cdma2000 1x system.

Figure 1:
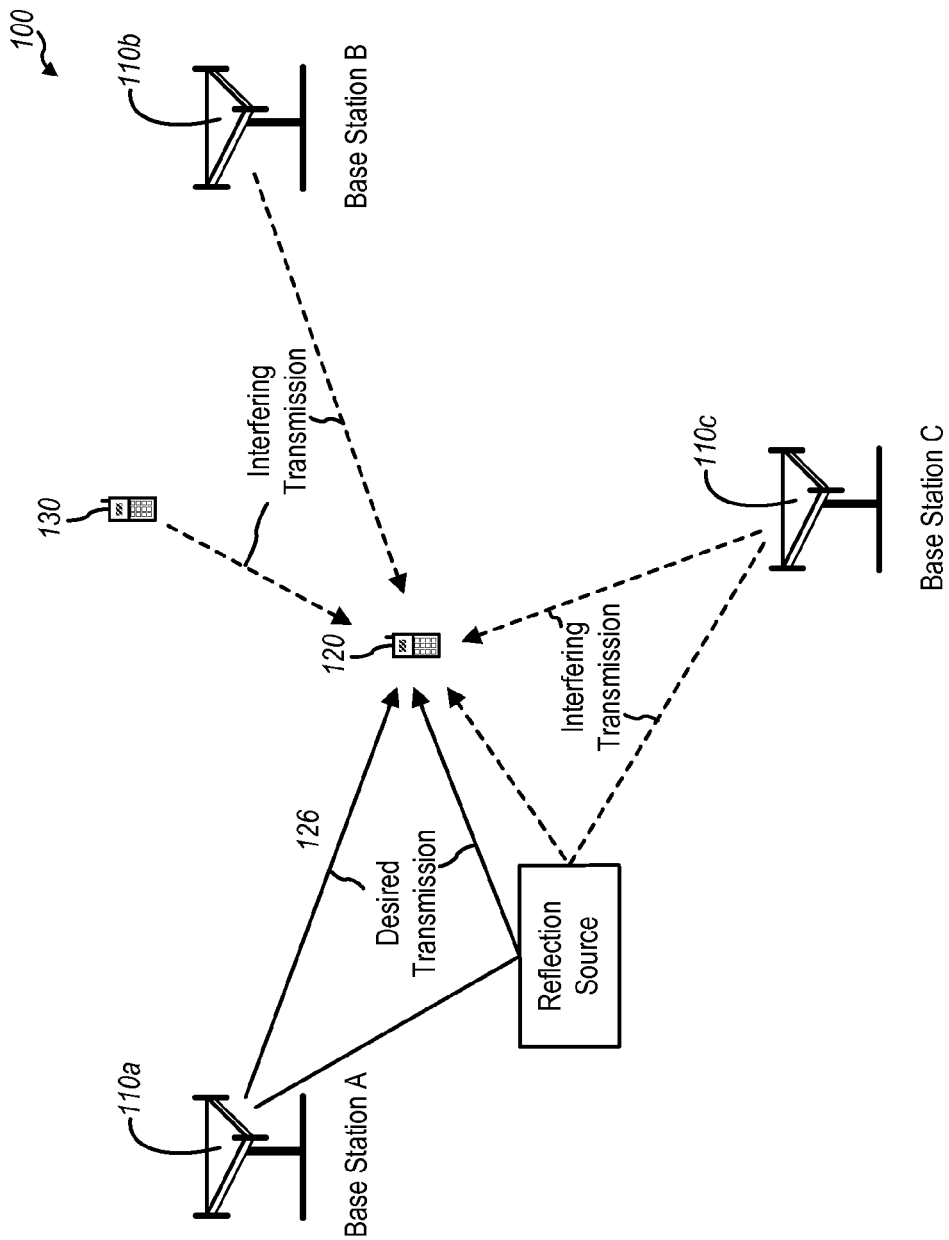
FIG. 1 shows a CDMA system with multiple base stations where a mobile device receives desired and interfering transmissions from the base stations.

FIG. 1 shows a CDMA system 100 with multiple base stations. For simplicity, FIG. 1 shows only three base stations 110a, 110b and 110c and one wireless device 120. A base station is generally a fixed station that communicates with the wireless devices and may also be called a Node B (3GPP terminology), an access point (AP), and so on. Each base station 110 provides communication coverage for a particular geographic area. The term "cell" can refer to a base station and/or its coverage area depending on the context in which the term is used. To improve system capacity, the base station coverage area may be partitioned into multiple (e.g., three) smaller areas. Each smaller area is served by a respective base transceiver subsystem (BTS). The term "sector" can refer to a BTS and/or its coverage area depending on the context in which the term is used. For a sectorized cell, the BTSs for all sectors of that cell are typically co-located within the base station for the cell. The following description assumes that each cell is partitioned into multiple sectors. For simplicity, the term "base station" generically refers to a fixed station for a cell as well as a fixed station for a sector. A serving base station/sector is a base station/sector with which a wireless device communicates.

As used herein, the term "wireless device" may connote a fixed or mobile wireless device and may also be called user equipment (UE) (3GPP terminology), a mobile station (MS) (cdma2000 terminology), a user terminal, and so on. A wireless device may be a cellular phone, a personal digital assistant (PDA), a wireless modem card, and so on. A wireless device may communicate with zero, one, or multiple base stations on the forward and reverse links at any given moment. The forward link (or downlink) refers to the communication link from the base stations to the wireless devices, and the reverse link (or uplink) refers to the communication link from the wireless devices to the base stations. For simplicity, FIG. 1 shows only transmissions on the forward link. Wireless device 120 receives a desired transmission from serving base station 110a via line-of-sight and reflected paths and also may receive interfering transmissions from neighboring base stations 110b and 110c via line-of-sight or reflected paths. It is noted that for purposes of discussion in the present disclosure, the interfering transmissions at a wireless device or mobile station (e.g., 120) may be signals from either a base station or another wireless device utilizing either the same QOF set transmissions desired by the wireless device 120, or from non-orthogonal QOF sets from base stations or signals from other wireless devices 130 not desired by the wireless device 120.

Figure 2:
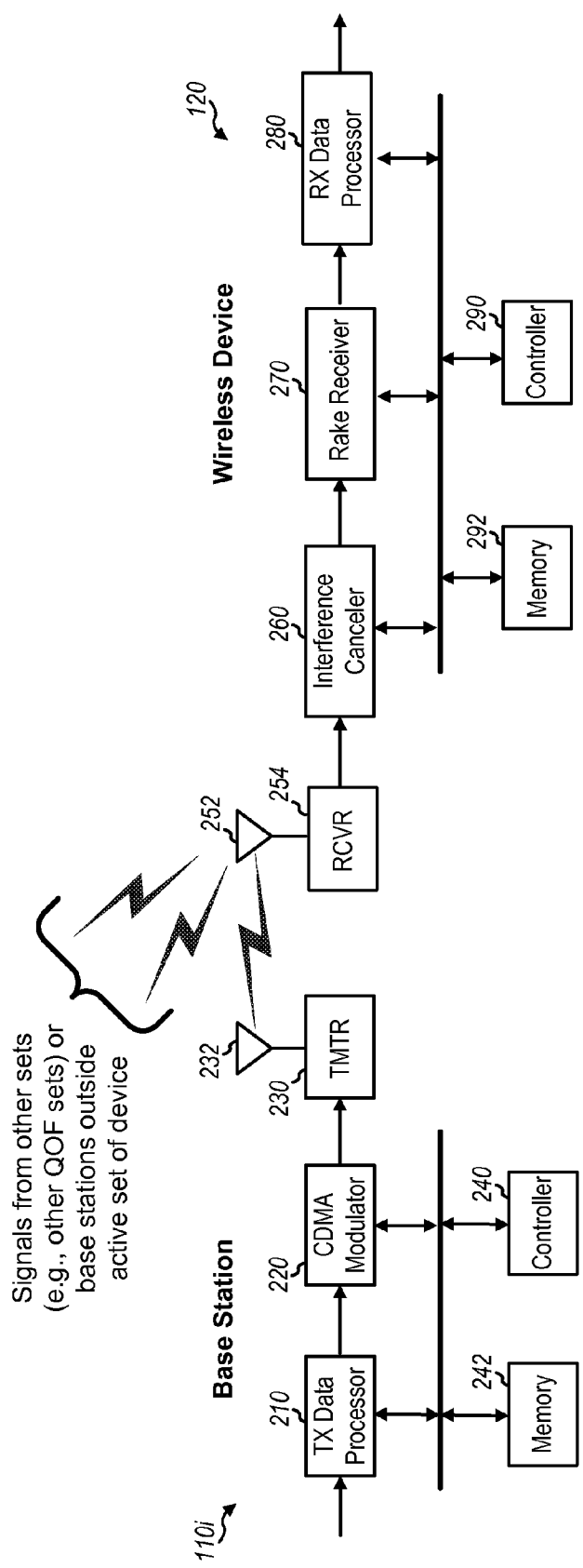
FIG. 2 shows a block diagram of a base station and a wireless device.

FIG. 2 shows a block diagram of an exemplary base station 110i and wireless device 120. Base station 110i may be any one of the base stations 110 shown in FIG. 1. For simplicity, FIG. 2 shows base station 110i having one transmit antenna and wireless device 120 having one receive antenna. In general, base station 110i and wireless device 120 may each be equipped with any number of antennas. For simplicity, FIG. 2 shows only the processing units for data transmission on the forward link (FL).

At base station 110i, a transmit (TX) data processor 210 receives traffic data for the wireless devices being served, processes (e.g., encodes, interleaves, and symbol maps) the traffic data to generate data symbols, and provides the data symbols to a CDMA modulator 220. As used herein, a data symbol is a modulation symbol for data, a pilot symbol is a modulation symbol for a pilot, a modulation symbol is a complex value for a point in a signal constellation (e.g., for M-PSK or M-QAM), a symbol is generally a complex value, and a pilot is data that is known a priori by both the base stations and the wireless devices. CDMA modulator 220 processes the data symbols and pilot symbols and provides a stream of output chips to a transmitter (TMTR) 230. Transmitter 230 processes (e.g., converts to analog, amplifies, filters, and frequency upconverts) the output chip stream and generates a forward link signal, which is transmitted from an antenna 232.

At wireless device 120, an antenna 252 receives the forward link signals transmitted by base station 110i as well as other base stations (e.g., interfering signals using different QOF sets from base station 110i). Antenna 252 provides a received signal to a receiver (RCVR) 254. Receiver 254 processes (e.g., filters, amplifies, frequency downconverts, and digitizes) the received signal and provides received samples to an interference canceller 260. Interference canceller 260 suppresses the interference from interfering base stations as will be described below and provides interference-canceled samples for the serving base station (110i) to a rake receiver 270.

Antenna 252 may receive the forward link signal from the serving base station via one or more signal paths as shown in FIG. 1, and the received signal may include one or more signal instances (or multipaths) for the serving base station. Rake receiver 270 processes all multipaths of interest and provides data symbol estimates, which are estimates of the data symbols sent by the serving base station. Rake receiver 270 may also be replaced with an equalizer or some other types of receiver. A receive (RX) data processor 280 processes (e.g., symbol demaps, deinterleaves, and decodes) the data symbol estimates and provides decoded data to other elements in the wireless device (120) such as a digital signal processor (DSP), which is not shown, or some other equivalent element. In general, the processing by rake receiver 270 and RX data processor 280 is complementary to the processing by CDMA modulator 220 and TX data processor 210, respectively, at base station 110$i$. Controllers/processors 240 and 290 direct operation at base station 110$i$ and wireless device 120, respectively. Memories 242 and 292 store data and program codes for base station 110$i$ and wireless device 120, respectively.

For CDMA, multiple orthogonal channels may be obtained with different orthogonal codes. For example, multiple orthogonal traffic channels are obtained with different Walsh codes in cdma2000, and multiple orthogonal physical channels are obtained with different orthogonal variable spreading factor (OVSF) codes in W-CDMA. The orthogonal channels may be used to send different types of data (e.g., traffic data, broadcast data, control data, pilot, and so on) and/or traffic data for different wireless devices. The orthogonal channels are appropriately scaled, combined, and spectrally spread across the entire system bandwidth. The spectral spreading is performed with a spreading code, which is a pseudo-random number (PN) sequence in cdma2000 and a scrambling code in W-CDMA. In cdma2000, the channelization with Walsh codes is called "covering", and the spectral spreading is called "spreading". In W-CDMA, the channelization with OVSF codes is called "spreading", and the spectral spreading is called "scrambling". For clarity, cdma2000 terminology (e.g., traffic channel, covering, spreading, and so on) is used in the following description.

Techniques for performing interference cancellation in a wireless communication system (e.g., a CDMA system) are described herein. As used herein, "cancellation" and "suppression" are synonymous terms and are used interchangeably. Additionally, techniques for performing interference cancellation in a wireless communication system utilizing QOF (e.g., cdma2000) among different QOF sets are described herein.

In the example of FIG. 2, it can be seen that wireless device 120 receives signals not just from base station 110$i$, but signals from other base Stations or other users (e.g., other QOF sets). Accordingly, in an exemplary aspect an orthogonal set 1 may contain the FL overhead channels (e.g., Pilot, Paging, and Sync) and traffic channels for a user, such a wireless device 120. A different orthogonal set (e.g., Orthogonal Set 2), which is introduced via QOF, may contain traffic channels for other users. In previous systems, QLIC is applied for mobile stations that are assigned to a single QOF orthogonal set (e.g., Orthogonal Set 1). According to an aspect of the present disclosure, QLIC is extended to channels in other orthogonal sets (e.g., Orthogonal Set 2).

It is noted that QOF is formed by multiplication of an underlying Walsh code with a PN code and a mask. The product of the PN code with the mask can be considered as merely another pseudo-random noise (PN) code since the QOF set is determined on a FL by this product multiplied by the Walsh code (i.e., the spreading code). Extension of QLIC to other QOF orthogonal sets is based on a recognition that this product can be viewed as another PN code that can be used by a QLIC engine to cancel the corresponding signal. Thus, signals received at a wireless device (e.g., 120) that carry different QOF sets may be considered similar to a signal from another co-located sector that also shares the same pilot signal. Signals from interfering or different QOF sets may be seen as equivalent to a base station at the same location transmitting signals, which is the same scenario in which known QLIC functions are used for cancellation of interfering signals (albeit orthogonal signals). Accordingly, with a modification of the QLIC function (or QLIC engine(s)) in a canceller (e.g., canceller 260) to account for additional QOF functions, QLIC may be applied for cancellation of signals interfering between QOF sets.

Furthermore, in another aspect the presently disclosed methods and apparatus may also include the further extension of linear cancellation techniques to cancel signals from base stations outside the active set of the wireless device (i.e., non-intended base stations). That is, conventional QLIC operates such that when demodulation of two signals from respective base stations is performed at a receiver, one of the demodulated signals is used to cancel the other signal, and vice versa. This requires knowledge by the mobile station of both signals; i.e., both base stations need to be in the active set of the mobile station. Many base stations not in the mobile station's active set (e.g., they are in a neighbor set), however, are transmitting signals that will interfere at the receiver of the mobile station or wireless device. Accordingly, in another aspect of the present disclosure, the QLIC function can be modified or extended to cancel these other signals. In particular, demodulation of the pilot channel is not needed since this is known a priori. Thus, if a pilot in one or more signals from non-intended based stations or not in the active set can be seen or identified, QLIC may be applied to cancel the signal of the non-intended base stations. In a particular example, the specific pilot (which is a particular known Walsh code) of the non-intended base station(s) may be cancelled. This cancellation results in an even greater increase in gain of the desired signal(s) on the FL.

In light of the above discussion, it will be appreciated that the presently disclosed methods and apparatus extend QLIC to at least two further scenarios not contemplated in conventional QLIC schemes.

Figure 3:
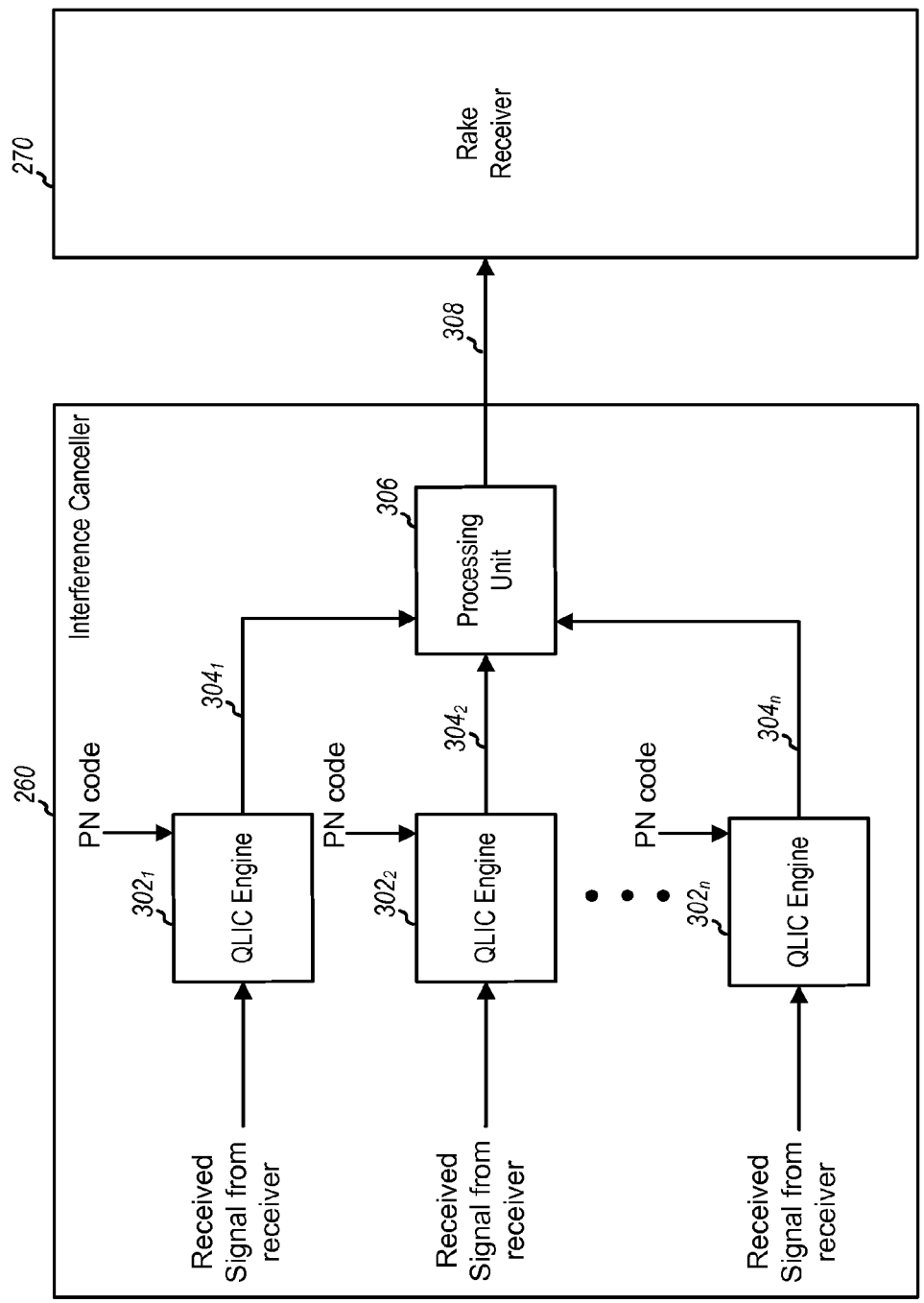
FIG. 3 shows a block diagram of the interference canceller and rake receiver as illustrated in FIG. 2.

FIG. 3 illustrates a block diagram of the interference canceller 260 and rake receiver 270 as illustrated in FIG. 2. It is first noted that for simplicity's sake the illustration of canceller 260 in FIG. 3 does not show specific details of how to arrange the QLIC functionalities, and various configurations may be applied as known in the art. Examples of QLIC engines or functionalities may be found in pending U.S. patent application Ser. Nos. 11/285,510, 11/535,848, and 12/020,417 all of which are assigned to the assignee hereof, and expressly incorporated by reference herein. Furthermore, the output of the canceller 260 is merely shown as a single output (e.g., 308) for simplicity to the rake receiver 270, but those skilled in the art will realize the output would contain a number of signal estimates that are input to fingers or finger processors of the rake receiver 270. The signal estimates may be determined using any of a number of known techniques, such as Minimum Mean Square Error (MMSE) as merely one example.

As shown in FIG. 3, the canceller 260 may comprise a number of QLIC functions to apply linear cancellation techniques to signals received by receiver 254. In an aspect, the QLIC function may be implemented by an n number of QLIC engines ($302_1$, $302_2$, ..., $302_n$). Each engine 302 has an input received signal, which is received by receiver 254 and output to the QLIC engines 302. Further, each engine 302 also receives an input PN code that is used by the QLIC engine 302 in generating a cancellation signal for signals having that particular PN code sequence. As discussed above, the presently disclosed methods and apparatus effect linear cancellation of either signals from another QOF set or base stations outside the active set of the wireless device (e.g., 120) receiving the signals. In the former case, the PN code sequence input to an engine 302 would be a PN code that is the product of a PN code and a QOF mask. In the later, the input PN code is a code used by the base stations outside the active set of the wireless device. It is noted that the PN code may be derived from any number of sources, such as a digital signal processor (DSP) or some other processor (not shown) in the wireless device (e.g., 120), as merely a couple examples.

The QLIC engines 302 are configured to apply linear cancellation techniques (e.g., QLIC) to the signals received and, in turn, output cancellation signals 304 to a processing unit or logic illustrated by block 306. It is noted that according to an aspect, the QLIC engines 302 may be configured, in particular, to determine at least one cancellation signal for at least one interfering signal from a first quasi-orthogonal function QOF set. This first QOF set is a set that is used by users or base stations either in the active set or neighbor set of the wireless device (e.g., device 120), but are nonetheless in a different QOF set from the set carrying a desired signal.

Additionally, either the processing unit 306, the rake receiver 270, another processing device (not shown), or any combination thereof may then be configured to determine a signal estimate for a desired transmitter transmitting a desired signal from a second QOF set (i.e., the set being used by the desired transmitter), wherein the signal estimate is based at least on the desired signal and the cancellation signal for the at least one interfering signal. That is, the cancellation signal is used to cancel out the interfering signal from the first quasi orthogonal set (e.g., a signal using a first QOF set) such that the final signal estimate output by canceller 260 will be the desired signal from a transmitter using a second set (i.e., a second QOF set).

It is noted that, in an aspect canceller 260 may be effected by one or more processors running instructions or code stored in memory or computer-readable media, software, hardware, firmware, or any combination thereof. It is further noted that one or more QLIC engines 302 may be configured to generate a cancellation signal based on an input PN to cancel a different QOF set, a non-intended base station signal, or a combination of cancelling QOF and non-intended base station signals. For example, QLIC engine $302_1$ could be configured to receive an input PN to cancel signals from a different QOF sets, whereas QLIC engine $302_2$ could be configured to receive a PN to cancel signals from non-intended base stations and so on. Furthermore, the functionality of the QLIC engines 302 could be changed as desired, such as engine $302_1$ cancels QOF sets for a certain time period or location and cancels signals from non-intended base stations in other periods or locations. It is also noted that the functionality of the QLIC engines also can include the original QLIC functionality of canceling signals from the same orthogonal set of base stations in the active set of the wireless device.

Figure 4:
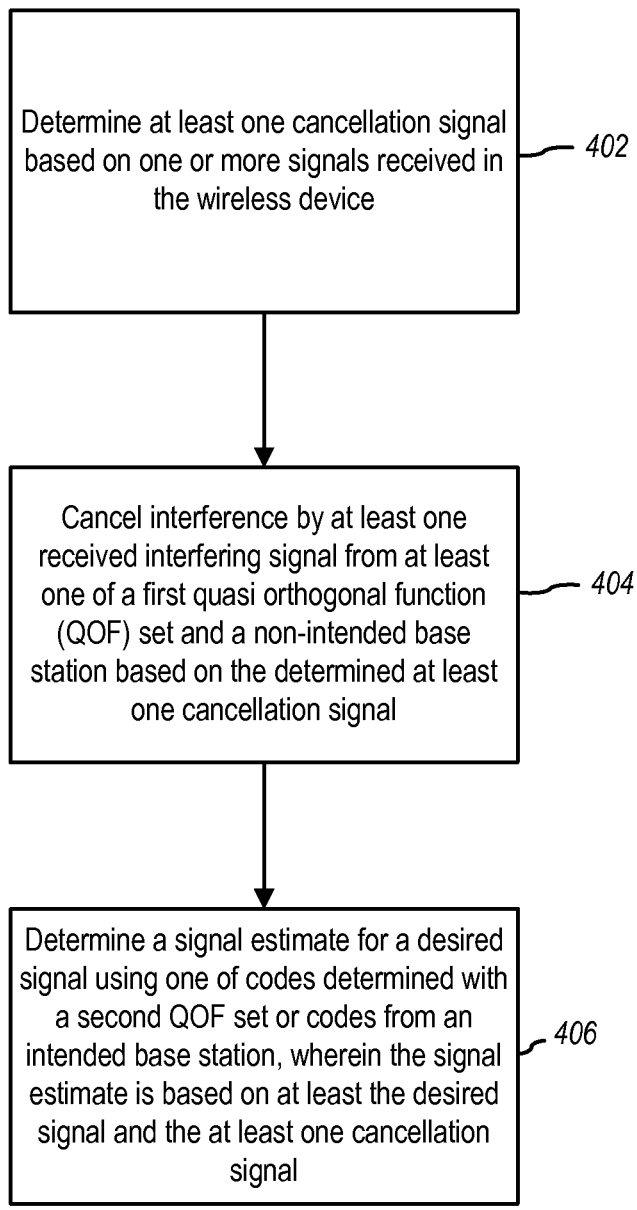
FIG. 4 illustrates a flow diagram of a method for applying interference cancellation to different QOF sets according to the present disclosure.

FIG. 4 illustrates a method 400 for applying interference cancellation to different QOF sets or signals from non-intended base stations in a wireless device according to the present disclosure. As illustrated, the method 400 includes determining at least one cancellation signal based on one or more signals received in the wireless device (e.g., device 120 in FIGS. 1 and 2) as illustrated in block 402. It is noted that the processes of block 402, in an aspect, may utilize linear interference canceling, such as QLIC. Furthermore, in an aspect apparatus such as the QLIC engines 302 illustrated in FIG. 3 may be used to implement the determination of the cancellation signal(s) (e.g., 304). Input of a particular PN code, as discussed before, determines the signals for which the QLIC engine 302 generates the cancellation signal.

After the determination in block 402, method 400 proceeds to block 404 where interference by at least one received interfering signal from at least one of a first quasi orthogonal function (QOF) set and a non-intended base station (i.e., a base station not an active set of the wireless device) is canceled based on the determined at least one cancellation signal determined in the processes of block 402. The process of block 404 may be effected by canceller 260, and in particular QLIC engines 302 and processing unit 306.

It is noted that method 400 may solely consist of the processes of blocks 402 and 404. In a further aspect, however, after block 404 flow may proceed to a further block 406. In block 406 a signal estimate for a desired signal is determined using codes determined with a second QOF set, wherein the signal estimate is based on at least the desired signal and the at least one cancellation. In the case of application of linear cancellation (e.g. QLIC) to signals from non-intended base stations, the process of block 406 would also determine the signal estimate for a desired signal, where the desired signal emanates from an intended base station or, in other words, a base station in the active list of the wireless device. The processes of block 406 may be implemented, for example, by canceller 260, rake receiver 270, a combination thereof, or another processor (not shown).

According to another aspect, the process of block 406 may apply linear interference cancellation techniques, such as QLIC, by canceling a pilot from a non-intended base station not in an active set of the wireless device, which was discussed previously. Since the pilot signal may be recognizable since the pilot is known, a priori, the pilot does not need to be demodulated, thus saving processing resources. Furthermore, since this cancellation takes places in a canceller of a receiver portion of the wireless device, a significant gain increase is realized in the receiver portion.

Figure 5:
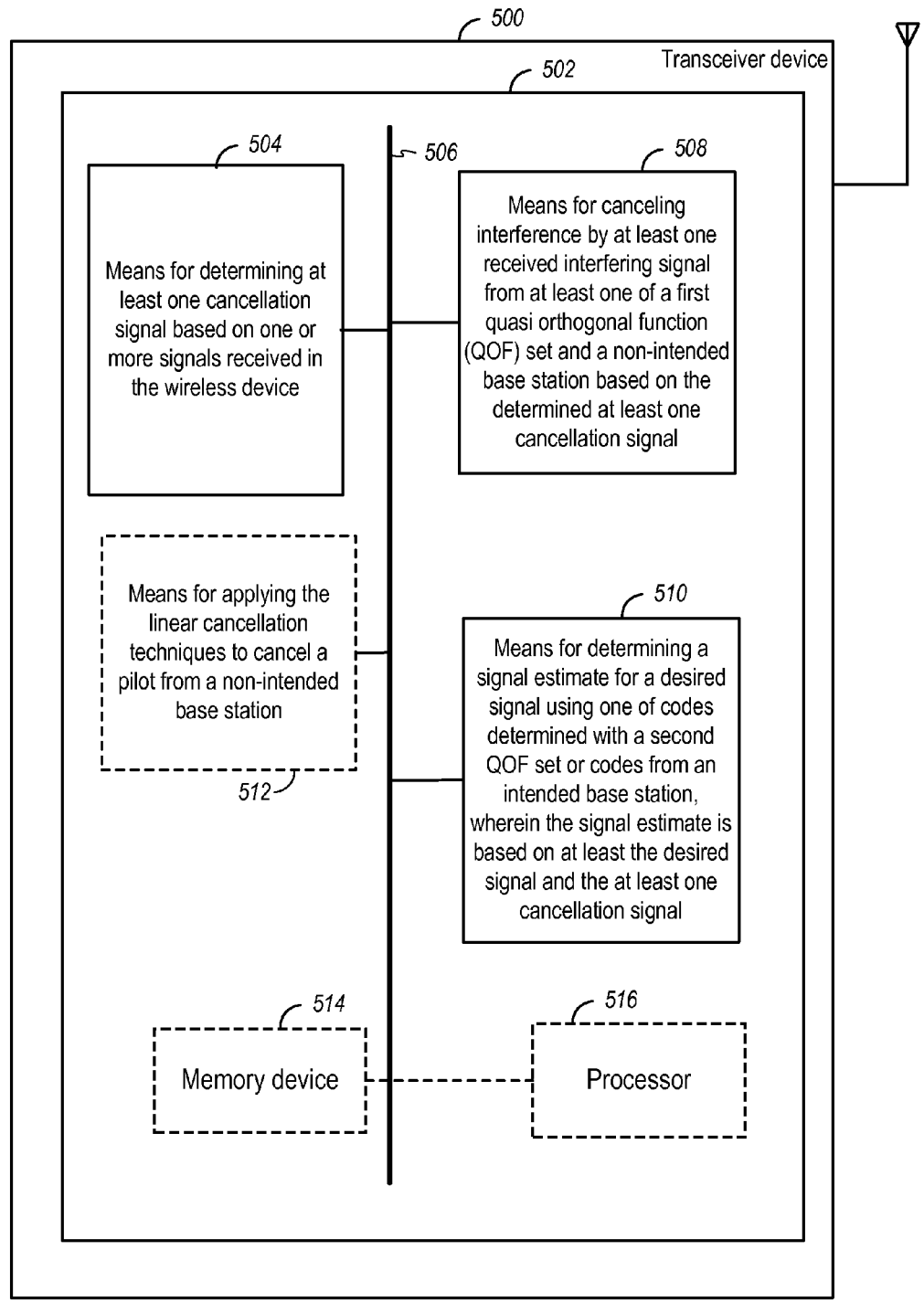
FIG. 5 is a block diagram of an apparatus that may be used to effect interference cancellation.

FIG. 5 illustrates an apparatus that may effect the methodology of FIG. 4 for cancellation of interfering signals from different QOF sets. In particular, FIG. 5 illustrates a block diagram of a transceiver device 500 (e.g., device 120) for use in a wireless communication system (e.g., a cdma2000 1x system) including an apparatus 502 that may be utilized for cancellation of interfering signals from different QOF sets. Apparatus 502 includes a module or means 504 for means for determining at least one cancellation signal based on one or more signals received in the wireless device. Means 504 may be implemented by logic or a processor within a canceller, such as canceller 260, another suitable processor such as a DSP, or any combination thereof. In another example, means 504 may be implemented by the QLIC engine(s) 302 illustrated in FIG. 3, a linear cancellation logic, or some equivalent hardware, software, or combination of hardware and software. It is noted that the functionality of means 504 is similar to the functions described above in connection with block 402 in FIG. 4.

It is noted that any of the disclosed means in apparatus 502 may communicate to various other modules or means in apparatus 502 via a bus 506 as illustrated, or similar suitable communication coupling.

Apparatus 502 also includes means 508 for canceling interference by at least one received interfering signal from at least one of a first quasi orthogonal function (QOF) set and a non-intended base station based on the determined at least one cancellation signal determined by mean 504. Means 508 may also be implemented by logic or a processor within a canceller, such as canceller 260, another suitable processor such as a DSP, or any combination thereof. In another example, means 504 may be implemented by the processing unit 306 as illustrated in FIG. 3 or some equivalent hardware, software, or combination of hardware and software. It is noted that functionality of means 508 is similar to the functions performed in block 404 of the method of FIG. 4.

In an alternative, apparatus 502 may further include a means 510 for determining a signal estimate for a desired signal using one of codes determined with a second QOF set or codes from an intended base station, wherein the signal estimate is based on at least the desired signal and the at least one cancellation signal from means 508 for the at least one interfering signal. Means 510 may be implemented by logic or a processor within a canceller, such as canceller 260, another suitable processor such as a DSP, or any combination thereof, as well as acting in conjunction with a Rake receiver, such as 270. It is noted that the functionality of means 510 is similar to processes discussed in connection with block 406 of FIG. 4.

Moreover, apparatus 502 may includes an optional means 512 for applying the linear cancellation techniques to cancel a pilot from a non-intended base station(s). This functionality may be completely independent as illustrated or be part of means 508 or 512 in order to, in part, improve receiver gain even further. Apparatus 502 may also further include an optional computer readable medium or memory device 514 configured to store computer readable instructions and data for effecting the processes and behavior of the modules or means. Additionally, apparatus 502 may include a processor 516 to execute the computer readable instructions stored in memory 514, and may be configured to execute one or more functions of the various modules or means in apparatus 502.

As described above, the disclosed methods and apparatus afford a reduction in the interference due to the use of additional orthogonal sets, such as those introduced by QOF, by extending linear cancellation techniques (e.g., QLIC) to cancel signals from those sets in a wireless device. Additionally, by reducing the interference, an increase in FL capacity results.

While, for purpose of simplicity of explanation, the methodologies are shown and described as a series or number of acts, it is to be understood that the processes described herein are not limited by the order of acts, as some acts may occur in different orders and/or concurrently with other acts from that shown and described herein. For example, those skilled in the art will appreciate that a methodology could alternatively be represented as a series of interrelated states or events, such as in a state diagram. Moreover, not all illustrated acts may be required to implement a methodology in accordance with the subject methodologies disclosed herein.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

It is noted that the word "exemplary" is used herein to mean "serving as an example, instance, or illustration." Any aspect described herein as "exemplary" is not necessarily to be construed as preferred or advantageous over other aspects.

The present description of the disclosed examples is provided to enable any person skilled in the art to make or use the present invention. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A method for interference cancellation in a wireless device, the method comprising:
   determining at least one cancellation signal based on signaling received in the wireless device; and
   canceling interference that is caused to a desired signal by at least one received interfering signal from one of a first quasi orthogonal function (QOF) set and a non-intended base station outside an active set of the wireless device based on the determined at least one cancellation signal, wherein said canceling cancels one of: interference that is caused to a desired signal from a base station within said active set by an interfering signal from the non-intended base station; and interference that is caused to a desired signal from a second QOF set by an interfering signal from the first QOF set, and wherein the second QOF set is non-orthogonal to the first QOF set;

wherein the at least one cancellation signal is determined using at least one quasi-linear interference cancellation (QLIC) operation;

wherein said determining includes determining at least one further cancellation signal, based on said signaling, and also using said at least one QLIC operation; and wherein said canceling includes canceling interference that is caused to a desired signal from the second QOF set by an interfering signal from the second QOF set based on said at least one further cancellation signal.

2. The method as defined in claim 1, further comprising:
determining a signal estimate for the desired signal using codes determined with the second QOF set, wherein the signal estimate is based on at least the desired signal and the at least one cancellation signal.

3. The method as defined in claim 1, wherein the at least one received interfering signal is at least one signal from the first QOF set.

4. The method as defined in claim 1, wherein signals based on the first QOF set and the second QOF set are present in a co-located sector.

5. The method as defined in claim 1, wherein the at least one received interfering signal is from the non-intended base station.

6. The method as defined in claim 5, further comprising:
canceling interference by the at least one received interfering signal from the non-intended base station by canceling a pilot from the non-intended base station.

7. The method as defined in claim 1, wherein the wireless device is configured to operate in a cdma2000 1x radio access technology.

8. An apparatus for interference cancellation in a wireless device, the apparatus comprising:
at least one processor configured for:
determining at least one cancellation signal based on signaling received in the wireless device; and
canceling interference that is caused to a desired signal by at least one received interfering signal from one of a first quasi orthogonal function (QOF) set and a non-intended base station outside an active set of the wireless device based on the determined at least one cancellation signal, wherein said canceling cancels one of: interference that is caused to a desired signal from a base station within said active set by an interfering signal from the non-intended base station; and interference that is caused to a desired signal from a second QOF set by an interfering signal from the first QOF set, and wherein the second QOF set is non-orthogonal to the first QOF set; and
a memory coupled to the at least one processor;
wherein the at least one cancellation signal is determined using at least one quasi-linear interference cancellation (QLIC) operation;
wherein said determining includes determining at least one further cancellation signal, based on said signaling, and also using said at least one QLIC operation; and
wherein said canceling includes canceling interference that is caused to a desired signal from the second QOF set by an interfering signal from the second QOF set based on said at least one further cancellation signal.

9. The apparatus as defined in claim 8, wherein the at least one processor is further configured to determine a signal estimate for the desired signal using codes determined with the second QOF set, wherein the signal estimate is based on at least the desired signal and the at least one cancellation signal.

10. The apparatus as defined in claim 8, wherein the at least one received interfering signal is at least one signal from the first QOF set.

11. The apparatus as defined in claim 8, wherein signals based on the first QOF set and the second QOF set are present in a co-located sector.

12. The apparatus as defined in claim 8, wherein the at least one received interfering signal is from the non-intended base station.

13. The apparatus as defined in claim 12, wherein the at least one processor is further configured to cancel interference by the at least one received interfering signal from the non-intended base station by canceling a pilot from the non-intended base station.

14. The apparatus as defined in claim 8, wherein the wireless device is configured to operate in a cdma2000 1x radio access technology.

15. An apparatus for interference cancellation in a wireless device, the apparatus comprising:
means for determining at least one cancellation signal based on one or more signals received in the wireless device; and
means for canceling interference that is caused to a desired signal by at least one received interfering signal from at least one of a first quasi orthogonal function (QOF) set and a non-intended base station outside and active set of the wireless device based on the determined at least one cancellation signal, wherein said canceling cancels one of: interference that is caused to a desired signal from a base station within said active set by an interfering signal from the non-intended base station; and interference that is caused to a desired signal from a second QOF set by an interfering signal from the first QOF set, and wherein the second QOF set is non-orthogonal to the first QOF set;
wherein the at least one cancellation signal is determined using at least one quasi-linear interference cancellation (QLIC) operation;
wherein said determining includes determining at least one further cancellation signal, based on said signaling, and also using said at least one QLIC operation; and
wherein said canceling includes canceling interference that is caused to a desired signal from the second QOF set by an interfering signal from the second QOF set based on said at least one further cancellation signal.

16. The apparatus as defined in claim 15, further comprising:
means for determining a signal estimate for the desired signal using codes determined with the second QOF set, wherein the signal estimate is based on at least the desired signal and the at least one cancellation signal.

17. The apparatus as defined in claim 15, wherein the at least one received interfering signal is at least one signal from the first QOF set.

18. The apparatus as defined in claim 15, wherein signals based on the first QOF set and the second QOF set are present in a co-located sector.

19. The apparatus as defined in claim 15, wherein the at least one received interfering signal is from the non-intended base station.

20. The apparatus as defined in claim 19, wherein the means for canceling interference by the at least one received interfering signal from the non-intended base station cancels interference by canceling a pilot from the non-intended base station.

21. The apparatus as defined in claim 15, wherein the wireless device is configured to operate in a cdma2000 1x radio access technology.

22. A computer program product, comprising:
a non-transitory computer-readable medium comprising:
code for causing a computer to determine at least one cancellation signal based on signaling received in a wireless device; and
code for causing a computer to cancel interference that is caused to a desired signal by at least one received interfering signal from one of a first quasi orthogonal function (QOF) set and a non-intended base station outside an active set of the wireless device based on the determined at least one cancellation signal, wherein said code for causing a computer to cancel includes code for causing the computer to cancel one of: interference that is caused to a desired signal from a base station within said active set by an interfering signal from the non-intended base station; and interference that is caused to a desired signal from a second QOF set by an interfering signal from the first QOF set, and wherein the second QOF set is non-orthogonal to the first QOF set;
wherein the at least one cancellation signal is determined using at least one quasi-linear interference cancellation (QLIC) operation;
wherein said code for causing a computer to determine includes code for causing the computer to determine at least one further cancellation signal, based on said signaling, and also using said at least one QLIC operation; and
wherein said code for causing a computer to cancel includes code for causing the computer to cancel interference that is caused to a desired signal from the second QOF set by an interfering signal from the second QOF set based on said at least one further cancellation signal.

23. The computer program product as defined in claim 22, wherein the non-transitory computer-readable medium further comprises code for causing a computer to determine a signal estimate for the desired signal using codes determined with the second QOF set, and wherein the signal estimate is based on at least the desired signal and the at least one cancellation signal.

24. The computer program product as defined in claim 22, wherein the at least one received interfering signal is at least one signal from the first QOF set.

25. The computer program product as defined in claim 22, wherein signals based on the first QOF set and the second QOF set are present in a co-located sector.

26. The computer program product as defined in claim 22, wherein the at least one received interfering signal is from the non-intended base station.

27. The computer program product as defined in claim 26, wherein code for causing a computer to cancel interference by the at least one received interfering signal from the non-intended base station includes code for causing a computer to cancel a pilot from the non-intended base station.

28. The computer program product as defined in claim 22, wherein the wireless device is configured to operate in a cdma2000 1x radio access technology.

* * * * *